United States Patent [19]

LaRue

[11] Patent Number: 4,961,549
[45] Date of Patent: Oct. 9, 1990

[54] ASYMMETRICAL PNEUMATIC DEICER

[75] Inventor: Albert M. LaRue, Akron, Ohio

[73] Assignee: The B. F. Goodrich Company, Akron, Ohio

[21] Appl. No.: 403,913

[22] Filed: Sep. 1, 1989

Related U.S. Application Data

[63] Continuation of Ser. No. 726,574, Apr. 24, 1985, abandoned.

[51] Int. Cl.$^5$ ............................................. B64D 15/18
[52] U.S. Cl. ................................................ 244/134 A
[58] Field of Search ................. 244/219, 35 A, 134 A, 244/134 R

[56] References Cited

U.S. PATENT DOCUMENTS

| | | | |
|---|---|---|---|
| 1,890,286 | 12/1932 | Geer | 244/134 A |
| 2,320,017 | 5/1943 | Spicer | 244/134 A |
| 2,418,262 | 4/1947 | Hunter | 244/134 A |
| 2,567,804 | 9/1951 | Davies | 244/134 A |
| 2,937,826 | 5/1960 | Johnson | 244/134 A |
| 4,516,745 | 5/1985 | Ely et al. | 244/134 A |

FOREIGN PATENT DOCUMENTS 626780  7/1949  United Kingdom ............. 244/35 A

OTHER PUBLICATIONS

Kermod, A. C., *Mechanics of Flight*, Eighth edition, Pitman, pp. 96–101.

Anderson, Jr., J. D., *Introduction to Flight Its Engineering & History*, McGraw-Hill Book Company, New York, pp. 165–179.

*Primary Examiner*—Galen Barefoot
*Attorney, Agent, or Firm*—W. W. Ban; D. M. Ronyak

[57] ABSTRACT

A pneumatic deicer for a strut or airfoil having a knife-edge or wedge leading edge wherein one spanwise tube of the deicer envelopes the leading edge and is positioned with at least 55% but not more than about 75% of the width of the spanwise deicer tube positioned on one surface of the wedge, the remaining portion of the width being positioned on the remaining surface of the wedge.

13 Claims, 1 Drawing Sheet

ASYMMETRICAL PNEUMATIC DEICER

This is a continuation of application Ser. No. 06/726,574, filed Apr. 24, 1985 abandoned.

FIELD OF THE INVENTION

This invention relates to pneumatic devices for deicing of aircraft components. More particularly, this invention relates to such devices wherein a boot of resilient material such as rubber is attached to an aircraft component and is configured to be pneumatically inflated in order to dislodge ice forming upon the component. More specifically, this invention relates to such pneumatic deicing devices as applied to aircraft components such as airfoils and struts having a sharp leading edge such as a so-called knife-edge or wedge shaped configuration.

BACKGROUND OF THE INVENTION

Since the early days of powered aviation, aircraft have been from time to time troubled by accumulations of ice on component surfaces of the aircraft such as wings and struts under certain flight conditions. Unchecked, such accumulations can eventually so laden the aircraft with additional weight and so alter the airfoil configuration of the wings as to precipitate an unflyable condition. A search for means to combat the accumulation of ice under flying conditions has been a continuing one and has resulted in three generally universal approaches to removing accumulated ice, a process known generically as deicing.

In one form of deicing, leading edges, that is edges of the aircraft component impinged by the air flowing over the aircraft and having a point at which this airflow stagnates, are heated to loosen adhesive forces between accumulating ice and the aircraft component. Once loosened, this ice is generally blown from the aircraft component by the airstream passing over the aircraft. Two methods of heating leading edges have enjoyed significant popularity: In one approach a heating element is placed in the leading edge zone of the aircraft component either by inclusion in a rubber boot applied over the leading edge or by incorporation into the skin structure of the aircraft component. This heating element, typically powered by electrical energy derived from a generating source driven by one or more of the aircraft engines, is switched on and off to provide heat sufficient to loosen accumulating ice. In very small aircraft powered typically by one or two engines, a sufficient quantity of electrical power may be unavailable for the use of electrical deicing.

In the other heating approach, gasses from one or more compression stages of a turbine engine at elevated temperature are circulated through leading edges of components such as wings and struts in order to effect a thermal deicing or antiicing. Employed in aircraft powered by turbine engines, the use of so-called compressor bleeds or by-pass streams from the aircraft engine turbine can result in reduced fuel economy and a lower turbine power output.

In limited situations a chemical is applied to all or part of the aircraft to depress adhesion of ice to the aircraft or to depress the freezing point of water collecting upon surfaces of the aircraft.

The remaining commonly employed method for deicing is typically termed mechanical deicing. In the principal commercial mechanical deicing means, pneumatic deicing, the leading edge zone of a wing or strut component of an aircraft is covered with a plurality of expandable generally tube-like structures inflatable employing a pressurized fluid, typically air. Upon inflation the tubular structures tend to expand the leading edge profile of the wing or strut and crack ice accumulating thereon for dispersal into the airstream passing over the aircraft component. Typically such tube like structures have been configured to extend substantially parallel to the leading edge of the aircraft component. For airfoils such as wings and stabilizers, these structures may extend the entire span of the airfoil. A plurality of tubelike structures frequently are positioned on a wing or strut typically configured to be parallel the leading edge of the wing or strut as by placement in a chord-wise succession away from the leading edge. The plurality of tubes can provide an ice removal function to the entire leading profile of the airfoil or strut.

Certain aircraft components can be possessed of a variety of leading edge profiles. One classical profile is a so-called blunt or bull nosed, substantially rounded leading edge profile having a substantial radius as a percent of the chord of the leading edge which typifies many older aircraft. Such a blunt profile typically includes a generally smoothly rounded, dome shaped leading edge having a large radius. In other, often used component profiles, the leading edge may assume a reduced bluntness resembling a so-called quadrant wedge, but the profile still includes a substantial rounding of the leading edge of the aircraft component characterized by a substantial radius of curvature as a percent of chord. More recently, so-called wedge or knifeedge leading edges have been utilized. In a wedge or knife-edge leading edge, a pair of essentially flat aircraft component surfaces join at an acute angle having a quite modest rounded surface area characterized by a radius of curvature representing a relatively small percent of the chord of the leading edge.

With such wedge or knife edge leading edge profiles, some significant difficulty can occur in applying conventional pneumatic deicing techniques to the deicing of such leading edges.

The ice collection efficiency is high at the small-radius leading edge characterizing knife-edge profiles and the ice collection efficiency is low aft of such leading edges so that ice accretes in a relatively narrow band along the leading edge. With conventional deicers that include a pair of pneumatic tubes straddling the leading edge, this ice is not subject to desirably great movement with inflation of such straddling deicer tubes. Where a tube of a conventional deicer wraps around a leading knife edge uniformly to be symmetrically positioned with equal width portions on each surface, a tendency also can develop for accumulated ice to be pushed forward along the wing structure as the deicer tubes inflate without cracking or breaking to facilitate removal. A pocket forms thereby between the accumulated ice and the pneumatic deicer whereby further inflation cycles of the pneumatic deicer can fail to remove the ice accumulation.

A pneumatic deicer for knife-edge or wedge leading edge profiles that provides a reliable ice cracking action while tending to avoid movement of accumulated ice forward along the aircraft component upon inflation could find substantial application in deicing particularly wings, stabilizers, struts, and other appendages having such a leading edge profile.

DISCLOSURE OF THE INVENTION

The present invention provides a pneumatic deicer for deicing so-called knife-edge or wedge leading edge profiles of aircraft components such as airfoils, stabilizers, and struts and other appendages. The deicer of the present invention is uniquely configured for use on aircraft components presenting a leading edge profile to an airstream flowing thereover having a so-called knife edge or wedge profile formed by the intersection of two essentially flat surfaces and characterized by a very small radius of curvature.

In the present invention, a pneumatic deicer having one or more expandable or inflatable tube structures is applied to the component, the applied deicer inflatable tubular structures each being possessed of a length and a width. Typically this length is substantially greater than the corresponding width and the deicer is placed upon the component whereby the length generally parallels the leading edge of the component. One of the tubular structures is placed upon the component in a configuration enveloping the leading edge and having not less than about 55% of the width of the particular tubular section positioned upon one essentially flat surface intersecting at the leading edge and the balance of the width of the tubular section wrapping around the leading edge and being positioned upon the remaining essentially flat surface intersecting the leading edge. The width of the one tubular section positioned enveloping the leading edge is thereby configured to asymmetrically envelope the leading edge.

In order to deice a knife or tapered wedge leading edge, the asymmetrically configured tubular section is alternately inflated and deflated. Where additional tubular structures have been applied to the essentially flat component surfaces intersecting at the leading edge, these tubular structures also are applied in a manner whereby the length of each tubular structure generally parallels the leading edge. These additionally applied tubular structures upon the essentially flat surfaces intersecting at the leading edge may be inflated and deflated simultaneously in conjunction with the asymmetrically applied tubular structure. Alternately, these additional tubular structures may be inflated in a staggered manner whereby an inflation pattern begins with inflation of the asymmetrically positioned leading edge tubular structure and then proceeds with inflation of tubular structures in a chord wise manner across one or both of the essentially flat surfaces.

Asymmetrical positioning of the one tubular section enveloping the leading edge, during inflation, introduces a translational motion to accumulations of ice upon the leading edge both forward along a plane established generally by the aircraft component being deiced and also in a direction perpendicular to the plane established generally by the aircraft component, thus effectively cracking accumulations of ice and also bringing the accumulations generally away from the point of stagnation of the airstream flowing over the aircraft component at the leading edge. Ice movement away from the point of stagnation facilitates the deicing function by moving the ice away from the stable position in which it forms and by thrusting the cap of ice more directly into an ice scavenging airstream flowing over the aircraft component.

The above and other features and advantages of the instant invention will become more apparent when considered in view of the figures and a description of a preferred embodiment of the invention that follow together forming a part of the specification.

BEST EMBODIMENT OF THE INVENTION

Figure 1:
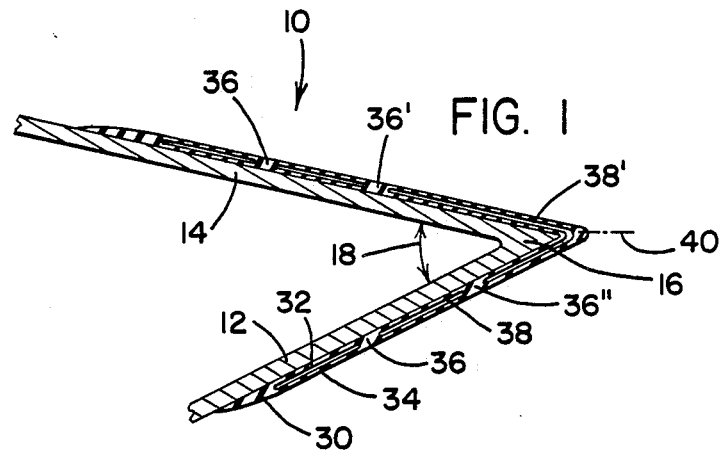
FIG. 1 depicts a tapered or knife edge leading edge of an airfoil having a deicer according to the instant invention mounted thereon in a deflated state.

Referring to the drawings, FIG. 1 depicts a knife-edge leading edge portion 10 of a wing airfoil. The leading edge portion 10 includes a pair of essentially flat wing surfaces 12, 14 intersecting at a so-called knife-edge or wedge leading edge 16. By the term essentially flat what is meant is a surface having a radius of curvature substantially exceeding a width of the surface, that is a distance between leading edge and a trailing edge, not shown, of the surface relative to airflow over the surface, and preferably approaching infinity. The intersection between the essentially flat surfaces 12, 14 defines a substantially acute angle 18. Typically, this angle is less than 45°, and most typically this angle does not exceed about 30°. In many embodiments of the airfoil 10 this angle 18 does not exceed about 20°.

A pneumatic deicer 30 is affixed to the airfoil leading edge 10. The pneumatic deicer 30 typically includes at least one zone 32 affixed to the airfoil leading edge 10 and the second zone 34. The zones 32, 34 are joined at points 36, 36', 36" periodically spaced along the deicer 30. The points 36, 36', 36" of joinder define tubular pockets 38, 38', structures or channels between the layers 34, 32.

The tubular channels, structures, or pockets 38, 38' typically extend in a spanwise fashion along the airfoil leading edge 10 over a substantial extent of the leading edge of the airfoil. These pockets or channels 38, 38' are configured for inflation employing a fluid under pressure such as air in well known manner. In FIG. 1, the pockets or channels 38, 38' are shown in the deflated state.

Figure 2:
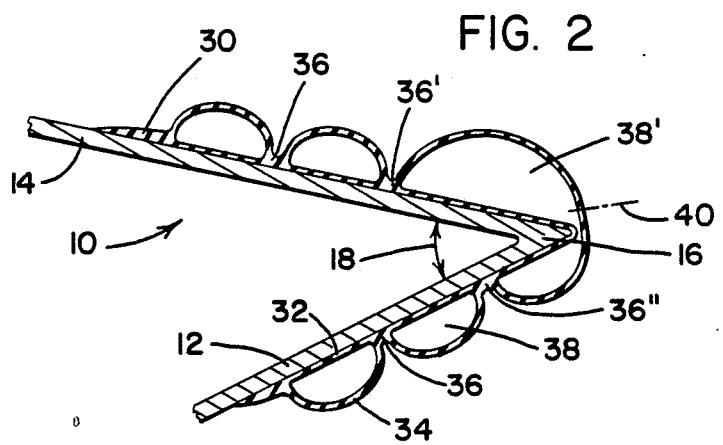
FIG. 2 depicts a deicer of the instant invention applied to a wedge or knife-edge leading edge of an aircraft wing with the deicer in an inflated state.

Referring to FIG. 2, the pockets or channels 38, 38' are shown in the inflated position whereby the layer 34 is distended away from the airfoil leading edge. In the distended state, any ice adhering to the layer 34 is also distended causing cracking of the ice and its removal by a stream of air flowing over the airfoil leading edge 10.

Referring to FIG. 1, a point 40 identifies material of the deicer located at a point of stagnation on the leading edge profile 10 where air impinging upon the leading edge profile 10 of the airfoil divides for flow over and under the airfoil. Airflow velocities at this point 40 associated with stagnation can approach zero. Referring to FIG. 2, as a result of distention of the outer layer 34, the material of the outer layer 34 previously located at the point 40 associated with stagnation in FIG. 1 has been distended away from the point 40. In the position of the material shown at the point 40 in FIG. 2, ice accumulations on the airfoil at the point 40 of stagnation in FIG. 1 prior to inflation of the deicer are now placed in a position 40 in FIG. 2 whereby the airstream passing over the airfoil of leading edge 10 scavengingly impinges on ice covering the material at point 40 in FIG. 2 formerly positioned at an airflow stagnant zone thereby substantially assisting in the removal of accumulated ice.

The reason for the arcural movement of the material represented by the point 40 upon inflation of the deicer is related to the positioning of one particular tubular channel 38'. Referring to FIGS. 1 and 2, the tubular channel 38' is positioned asymmetrically enveloping forward portions of the airfoil leading edge profile 10. A width of the tubular channel 38' extends from a joinder point 36' to a second joinder point 36". Of this width, at least 55% but not more than about 75% is positioned upon the essentially flat surface 14 with the balance of the width wrapping around the intersection 16 and being positioned upon the essentially flat surface 12. This asymmetrical positioning of the tubular channel 38' results in arcural movement of material represented by the point 40 in FIGS. 1 and 2 from the zone of stagnation on the airfoil leading edge 10 into a scavenging stream of air flowing over the airfoil leading edge 10 as the deicer is inflated.

It is believed that this range of 55% to 75% of the width of the tubular structure being positioned upon one of the essentially flat surfaces 12, 14 provides a desirably elevated motion of the deicer material represented by the point 40 out of the plane established by the airfoil leading edge profile 10. A lesser or greater asymmetry than the range of 55% to 75% is believed to produce undesirably smaller translocations of the deicer material associated with the point 40 from the plane established by the airfoil leading edge 10 upon inflation of the tubular structure 38'. Such smaller translocational motion imparts a smaller translocational motion to ice accumulated upon the intersection 16 and can substantially impair removal of the ice accumulations by failing to place the ice accumulation squarely in the scavenging stream of air.

The precise selection of a desired degree of asymmetry in affixing the tubular section wrapping around the leading edge will, in part be determined by trial and error. Factors affecting such a selection will include the angle 18, the radius of curvature of the intersection 16, and the extent of intrusion of the deicer tubular section 38' that can be tolerated into the airstream flowing over the leading edge 10. It is important that significant translational motion be achieved of the point represented by the reference numerals 40 in FIGS. 1 and 2 out of the plane established by the leading edge relative to the airstream flowing thereover, to assure removal of an ice cap forming on the leading edge 10 particularly configured to be concentrated in the zone at the leading edge of substantial ice accretion.

In use, the asymmetrically positioned channel 38' may be inflated initially to crack and begin separating ice and then remaining tubular air channels 38 may be inflated to complete removal of accumulated ice. Alternately, should a sufficient supply of compressed air be available, all tubular channels 38, 38' may be inflated simultaneously. In other preferred embodiments, the tubular channel 38' may be inflated followed sequentially outwardly along a chord of the airfoil leading edge 10 by the remaining channels 38 on only one of the essentially flat surfaces 12, 14.

The layers or plies 32, 34 may be of any suitable or conventional construction. Conventional constructions are well known in the art. Typically the layers or plies 32, 34 include a fabric reinforcement (not shown) and an elastomeric component coating at least one surface of the fabric reinforcement. The points 36, 36', 36" of joinder between the layers or plies 32, 34 can be formed by adhesion, stitching, or curing between the layers in well known manner.

From time to time it may be desirable to employ more than the two layers 32, 34 in forming the tubular sections and it may be desirable to introduce stiffeners or supports within the tubular sections or structures 38, 38' to facilitate inflation and deflation by facilitating the passage of air through the tubular sections. Interconnection of adjoining tubular sections whereby air introduced into one tubular section can be transmitted therethrough into a next adjoining tubular section are contemplated as within the purview of this invention. Conventional means for introducing air into the tubular structures 38, 38' are known and may be employed in the practice of the invention.

While a preferred embodiment has been shown and described in detail, it should be apparent that various modifications and alterations may be made thereto without departing from the scope of the claims that follow.

What is claimed is:

1. A pneumatic deicer applied upon an aircraft component wherein a pair of essentially flat surfaces of the component join to define a component wedge profile, the wedge profile being configured to establish a leading edge of the component, the deicer comprising an inner layer affixed to the leading edge and an outer distensible layer joined to said inner layer which together define at least one pneumatically inflatable tubular structure, the tubular structure having a length and width, the length being oriented generally parallel to the leading edge, said one inflatable tubular structure being affixed with length parallel to the leading edge and asymmetrically covering the leading edge, at least about 55% but not more than about 75% of the width of the tubular structure being positioned upon one of the essentially flat surfaces and the balance of the width wrapping around the leading edge and being positioned upon the other essentially flat surface when uninflated and when inflated.

2. The deicer of claim 1, the component being an airfoil.

3. The deicer of claim 1, the component being a strut.

4. A pneumatic deicer for application upon an aircraft component wherein a pair of essentially flat surfaces of the component join to define a component wedge profile, the wedge profile being configured to establish a leading edge of the component, the deicer comprising a plurality of pneumatically inflatable tube-like structures each having a length and width each comprising an inner layer affixed to the component and an outer distensible layer joined to said inner layer, the plurality of tubelike structures being affixed to the component with lengths substantially paralleling the leading edge, and one of the tubular structures being applied with length parallel to the leading edge and asymmetrically covering the leading edge with at least about 55% but not more than about 75% of the width of the asymmetrically applied structure being positioned upon one of the essentially flat surfaces and the balance of the width wrapping around the leading edge and being positioned upon the other essentially flat surface when uninflated and when inflated.

5. The deicer of claim 4, the component being an airfoil.

6. The deicer of claim 4, the component being a strut.

7. A method for pneumatically deicing an aircraft component presenting a pair of formed, generally flat surfaces configured to define a wedge profile leading edge for presentation to an airstream flowing over the aircraft comprising the steps of:

affixing to the component a pneumatic deicer including an inner layer affixed to the component and an outer distensible layer joined to the inner layer which together define at least one inflatable, generally tubular structure having a length and width;

positioning the tubular structures whereby the lengths generally parallel the leading edge;

positioning one such inflatable tubular structure whereby at all times at least about 55% but not more than about 75% of width of the tubular structure is affixed to one of the flat surfaces, and the remaining width wraps around the leading edge and is affixed to the other essentially flat surface; and alternately inflating and deflating the tubular structures.

8. The method of claim 7, the component being a strut.

9. The method of claim 7, a plurality of the tubular structures being applied generally parallel with the leading edge and in a chordwise spaced pattern leading away therefrom.

10. In a pneumatic deicer for an aircraft component presenting a knife-edge leading edge to an airstream flowing over the aircraft while in flight, the improvement comprising an inner layer affixed to the component and an outer distensible layer joined to said inner layer which together form a generally tubular pneumatic deicer structure positioned upon the component whereby a length dimension of the tubular deicer generally parallels the leading edge and when inflated and uninflated at least about 55% but not more than about 75% of a width dimension thereof lies to one side of the leading edge and the balance of the width dimension wraps around the leading edge to lie on the other side of the leading edge.

11. The improvement of claim 10, the component being a strut.

12. The improvement of claim 7, the component being an airfoil.

13. The improvement of claim 10, the component being an airfoil.

* * * * *